(12) United States Patent
Goswami et al.

(10) Patent No.: US 10,198,447 B2
(45) Date of Patent: Feb. 5, 2019

(54) ELECTRONIC FILE MIGRATION SYSTEM AND VARIOUS METHODS OF TRANSPARENT DATA MIGRATION MANAGEMENT

(71) Applicant: KOMPRISE, INC., Campbell, CA (US)

(72) Inventors: Kumar Goswami, Campbell, CA (US); Michael Peercy, Campbell, CA (US); Mohit Dhawan, Campbell, CA (US); Zahra Badey, Campbell, CA (US); Nahush Bhanage, Campbell, CA (US); Vikram Krishnamurthy, Campbell, CA (US)

(73) Assignee: KOMPRISE INC., Campbell, CA (US)

( * ) Notice: Subject to any disclaimer, the term of this patent is extended or adjusted under 35 U.S.C. 154(b) by 61 days.

(21) Appl. No.: 15/265,582

(22) Filed: Sep. 14, 2016

(65) Prior Publication Data

US 2017/0075907 A1    Mar. 16, 2017

Related U.S. Application Data

(60) Provisional application No. 62/218,409, filed on Sep. 14, 2015, provisional application No. 62/363,789, filed on Jul. 18, 2016.

(51) Int. Cl.
*G06F 11/00* (2006.01)
*G06F 17/30* (2006.01)
(Continued)

(52) U.S. Cl.
CPC .... *G06F 17/30079* (2013.01); *G06F 11/0709* (2013.01); *G06F 11/079* (2013.01);
(Continued)

(58) Field of Classification Search
CPC .............. G06F 11/1435; G06F 11/1469; G06F 11/0709; G06F 11/2094
See application file for complete search history.

(56) References Cited

U.S. PATENT DOCUMENTS

2008/0109811 A1* 5/2008 Krauthgamer ........ G06F 1/3203
 718/104
2011/0161491 A1* 6/2011 Sekiguchi ............. G06F 9/4856
 709/224
(Continued)

*Primary Examiner* — Charles Ehne
(74) *Attorney, Agent, or Firm* — Weiss & Moy, P.C.; Jeffrey D. Moy (57) ABSTRACT

An electronic file migration system that analyzes data and migrate qualifying files from a source file system to another or cloud file system. The system can infer access times of the files from create and modify times. The system copies "qualifying" (e.g. aged under a probationary period) files from a source file system to a cloud file system or other storage system, and substitutes them with symbolic links or stubs to the target copies. The system may provide seamlessly-automated and interoperable data archiving, backups, transfers, analytics, and optimizations in an organization. In addition, it may also be desirable to devise a novel electronic file migration system for a third-party service provider to seamlessly process, manage, optimize, and analyze data archiving, backups, and transfers in a client organization.

23 Claims, 5 Drawing Sheets

(51) Int. Cl.
  *G06F 11/07*  (2006.01)
  *H04L 29/08*  (2006.01)
  *H04L 29/06*  (2006.01)
  *H04L 29/14*  (2006.01)

(52) U.S. Cl.
  CPC ...... *G06F 11/0751* (2013.01); *G06F 11/0793* (2013.01); *H04L 67/10* (2013.01); *H04L 67/1004* (2013.01); *H04L 67/1097* (2013.01); *H04L 67/20* (2013.01); *H04L 69/04* (2013.01); *H04L 69/40* (2013.01)

(56) References Cited

U.S. PATENT DOCUMENTS

| | | | |
|---|---|---|---|
| 2012/0102280 A1* | 4/2012 | Nasu | G06F 11/1453 711/162 |
| 2015/0200833 A1* | 7/2015 | Cutforth | H04L 67/1097 709/224 |
| 2015/0234617 A1* | 8/2015 | Li | G06F 3/0647 711/114 |
| 2016/0124678 A1* | 5/2016 | Hasegawa | G06F 3/0643 711/112 |

* cited by examiner

On premise share access from Linux (NFS) client:
$ ls –al / Dir1
lrwxrwxr--x  1 kompuser  user1  14 Jul 17 06:50 file11 -> widelink/file11
lrwxrwx-w-  1 kompuser  user2  14 Jul 17 06:50 file12 -> widelink/file12
lrwx-wx----  1 kompuser  user3  24 Jul 17 06:50 widelink -> /UNC/Komprise/Share1
$ ls –al /Dir2
lrwxr-xr--x  1 kompuser  user1  14 Jul 17 06:50 file21 -> widelink/file21
-rwxr-x-wx  1 kompuser  user2  14 Jul 17 06:50 file22
lrwx--wx---  1 kompuser  user3  24 Jul 17 06:50 widelink -> /UNC/Komprise/Share1

An Example of Interoperable File Migration from an On-Premise System to a Cloud-Based File System

An Example of File Attribute Metadata Portability and Caching Tiers for Optimization of Searches, Listing, and Restoration to Source

ELECTRONIC FILE MIGRATION SYSTEM AND VARIOUS METHODS OF TRANSPARENT DATA MIGRATION MANAGEMENT

RELATED APPLICATIONS

This application claims the benefit of U.S. Provisional Application entitled "Electronic File Migration System and Method of Operation", filed Sep. 14, 2015, having Ser. No. 62/218,409 and U.S. Provisional Application entitled "Electronic File Migration System and Various Methods of Transparent Data Migration Management", filed Jul. 18, 2016, having Ser. No. 62/363,789, both of which are incorporated herein by reference in their entirety.

TECHNICAL FIELD

The present invention generally relates to network-based data backup and migration systems and methods. More specifically, embodiments of the present invention relate to cloud-based client platform-agnostic electronic file migration systems and various methods of transparent data migration and access management.

BACKGROUND

Modern information technology (IT) data management involves organizing, transferring, and storing a vast amount of ever-increasing accumulation of data across multiple data storages in various locations. Multiple data storages in various locations typically involve on-premise (i.e. onsite or localized) computerized data storages, offsite cloud-computing data storages, or a combination of both. Conventional IT data management also involves various application-specific and/or client-specific data management tools across different computing platforms, protocols, operating systems, and storage locations. These conventional data management tools often lack seamless interoperability and cause "information silos" (i.e. interoperability deficiency) in a corporate data management department.

Furthermore, conventional IT data management faces a daunting challenge in handling an ever-growing list of data storage and computer server resources for data backups and file migrations. Conventional IT data management solutions are not fully vendor-agnostic and tend to rely on hardware-specific conditions and parameters, which make data management less flexible, cumbersome, and often inefficient with wasted resources. A poor and ineffective IT asset resource utilization, also known as data storage and computer server "sprawl," is increasingly plaguing the modern IT data management landscape.

Therefore, it may be desirable to devise a novel electronic file migration system that overcomes the above issues.

SUMMARY

In accordance with one embodiment, an electronic file migration system is disclosed that extrapolates access times from file-related create and modify times to determine appropriate files for migration and required bandwidths involved in file migration.

In accordance with one embodiment, an electronic file migration is disclosed that incorporates a "file-aging" probation mode in a designated probationary location of a source data storage device. If a particular file in the designated probationary location of the source data storage is accessed by a user during the probationary period, then the file-aging probation mode is canceled and the particular file is reinstated back to an original location in the source data storage device. On the other hand, if the probationary period passes without the user access of the particular file, then the particular file in the designated probationary location of the source data storage device is simply deleted from the source data storage device, and a corresponding copy of the particular file is stored in another data storage system. The other data storage system may be a cloud data storage.

In accordance with one embodiment, an electronic file migration system is disclosed that migrates source files to another data storage system or cloud data storage (hereinafter cloud data storage) with a probationary period to monitor and selectively erase the migrated source files in the cloud data storage, if the source files have been accessed during the probationary period.

In accordance with one embodiment, an electronic file migration system is disclosed that minimizes a client's data access latency during file migration by keeping a record of modification time on files, taking multiple unique steps to qualify files, migrating qualifying files, and minimizing file lock hold times In accordance with one embodiment, an electronic file migration system is disclosed that refrains from migrating previously-qualified files that have changed before fixing (i.e. "cleaning up" or resolving) any discrepancies resulting from renaming, moving, or deleting of a migrated file.

In accordance with one embodiment, an electronic file migration system is disclosed that creates and maintains interoperable remote symbolic links.

In accordance with one embodiment, an electronic file migration system is disclosed that optimizes data storage and computational efficiency by performing file granular variable size chunking and metadata-sensitive transformations for a cloud resource-based data storage.

In accordance with one embodiment, an electronic file migration system is disclosed that reads a file and does not alter the access time of the file.

In accordance with one embodiment, an electronic file migration system is disclosed that provides seamless access to migrated files from the source via one or more sparse stubs or symbolic links that have been added during or after a file migration operation.

In accordance with one embodiment, an electronic file migration system is disclosed that can physically isolate metadata objects for portability.

In accordance with one embodiment, an electronic file migration system is disclosed that is capable of load balancing analysis and migration activities based on metrics of load per share.

In accordance with one embodiment, an electronic file migration system is disclosed that is capable of fault tolerance of analysis, migration, and access across several servers.

BRIEF DESCRIPTION OF THE DRAWINGS

The present application is further detailed with respect to the following drawings. These figures are not intended to limit the scope of the present invention but rather illustrate certain attributes thereof.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more novel electronic file migration systems and various methods of transparent data migration management with such novel systems. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, terms such as "cloud," "cloud network," "cloud computing," and "cloud resource" are each defined as any data storage system. The data storage system may be a remotely-connected data network environment in which data from an electronic system operatively connected to the remotely-connected data network environment is typically stored in a network-attached storage (i.e. typically in a remote location outside of an on-premise local data storage), instead of being solely stored in a local or on-premise storage of the electronic system. In one example, certain data contained in one or more files associated with the electronic system may be stored in both the local storage of the electronic system as well as the network-attached storage by default. In another example, the files associated with the electronic system may be stored in an on-premise data storage first, before getting migrated or archived to a remotely-located network-attached storage in a cloud network. Further, the terms "local" or "on-premise" should not be limited to a particular device or location but may be any type of storage device in any location. In a broad sense, the term "local" or "on-premise" device may be a device storing the file to be migrated.

Moreover, for the purpose of describing the invention, an "electronic system," a "computing unit," and/or a "main computing unit" are each defined as electronic-circuit hardware device, such as a computer system, a computer server, a data storage unit, or another electronic-circuit hardware unit controlled, managed, and maintained by a file migration module, which is executed in a CPU and a memory unit of the electronic-circuit hardware device for the electronic file migration management.

In addition, for the purpose of describing the invention, a term "computer server" is defined as a physical computer system, another hardware device, a software and/or hardware module executed in an electronic device, or a combination thereof. For example, in context of an embodiment of the invention, a "computer server" is dedicated to executing one or more computer programs for creating, managing, and maintaining a robust and efficient file migration system between a source or on-premise data storage and a cloud data storage for data backup and archiving. In a preferred embodiment of the invention, the source or on-premise data storage and the cloud data storage are connected to or incorporated in one or more computer servers for file migration system creation, management, and maintenance. Furthermore, in one embodiment of the invention, a computer server is connected to one or more data networks, such as a local area network (LAN), a wide area network (WAN), a cellular network, and the Internet.

Various embodiments of the invention are related to one or more electronic file migration systems that analyze data and migrate qualifying files from a source or on-premise file system to another storage system and/or cloud file system. The electronic file migration system also provides an access layer as a network protocol file server to retrieve targeted files from the other storage system/cloud. In a preferred embodiment of the invention, the electronic file migration system copies "qualifying" (e.g. aged under a probationary period) files from a source file system to another storage system/cloud file system, and substitutes them with symbolic links to the target copies. The substitution step may be omitted or replaced with a delete in certain instances of the system usage (e.g. a data backup task).

In the description below, the terms "source", "local" and "on-premise" may be used interchangeably. In a similar fashion, the terms "cloud" storage and "another storage" may be used interchangeably.

Figure 1:
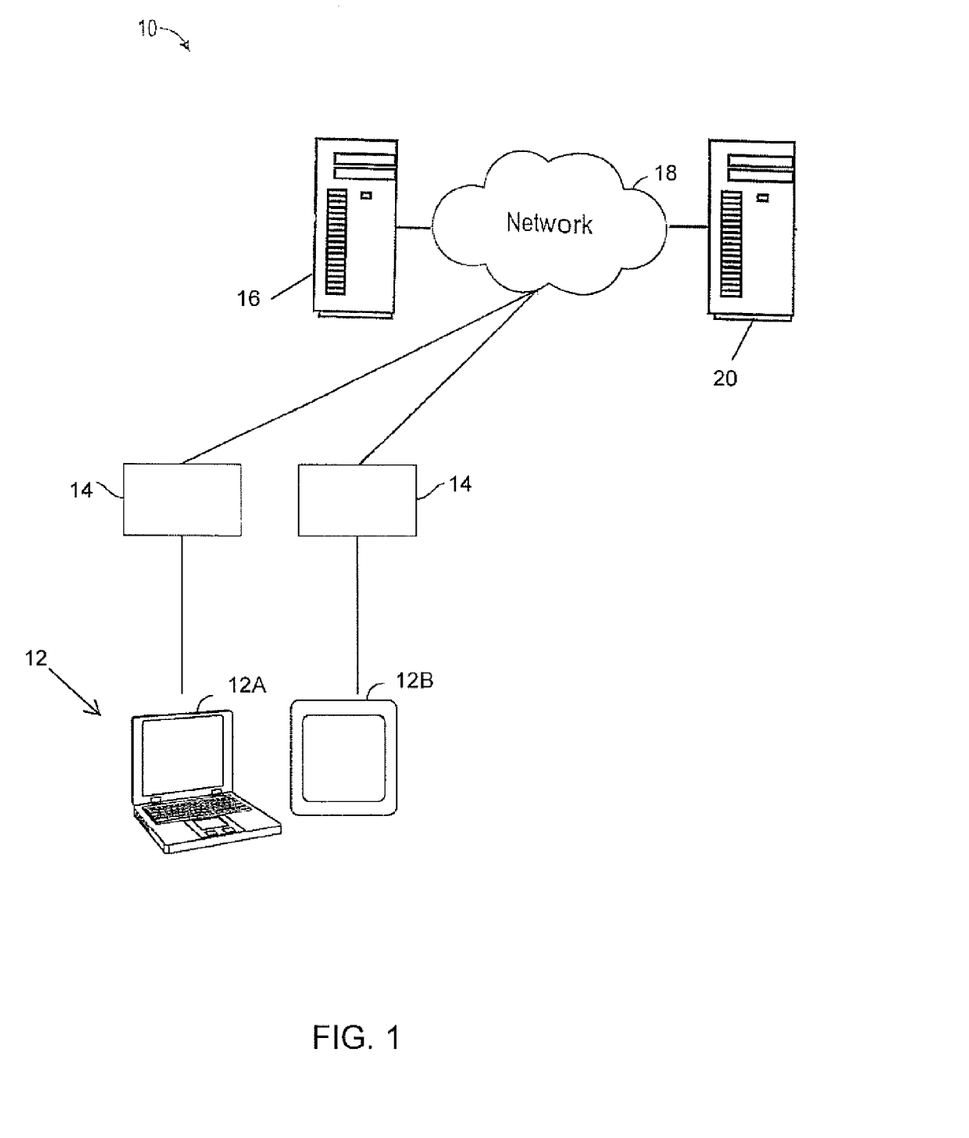
FIG. 1 is a diagram of an exemplary electronic file migration system according to one aspect of the present application.

Referring to FIG. 1, a cloud-based client platform-agnostic electronic file migration system using various methods of transparent data migration management 10 (hereinafter system 10) may be seen. The components of the system 10 may be coupled through wired or wireless connections.

The system may have one or more computing devices 12. The computing devices 12 may be a client computer system such as a desktop computer, handheld or laptop device, tablet, mobile phone device, server computer system, multiprocessor system, microprocessor-based system, network PCs, and distributed cloud computing environments that include any of the above systems or devices, and the like. The computing device 12 may be described in the general context of computer system executable instructions, such as program modules, being executed by a computer system as may be described below. In the embodiment shown in FIG. 1, the computing device 18 may be seen as a desktop/laptop computing system 12A and a tablet device 12B. However, this should not be seen in a limiting manner as any computing device 12 described above may be used.

The computing devices 12 may be loaded with an operating system 14. The operating system 14 of the computing device 12 may manage hardware and software resources of the computing device 12 and provide common services for computer programs running on the computing device 1.

The computing devices 12 may be coupled to a server 16. The server 16 may be used to store data files, programs and the like for use by the computing devices 12. The computing devices 12 may be connected to the server 16 through a network 18. The network 18 may be a local area network (LAN), a general wide area network (WAN), wireless local area network (WLAN) and/or a public network. In accordance with one embodiment, the computing devices 12 may be connected to the server 16 through a network 18 which may be a LAN through wired or wireless connections.

The system may have one or more servers 20. The servers 20 may be coupled to the server 16 and/or the computing devices 12 through the network 18. The network 18 may be a local area network (LAN), a general wide area network (WAN), wireless local area network (WLAN) and/or a public network. In accordance with one embodiment, the server 16 may be connected to the servers 20 through the network 18 which may be a WAN through wired or wireless connections.

The servers 20 may be used for migration and data back-up. The server 20 may be any data storage devices/system. In accordance with one embodiment, the server 20 may be cloud data storage. Cloud data storage is a model of data storage in which the digital data is stored in logical pools, the physical storage may span multiple servers (and often locations), and the physical environment is typically owned and managed by a third party hosting company. However, as defined above, cloud data storage may be any type of data storage device/system.

Figure 2:
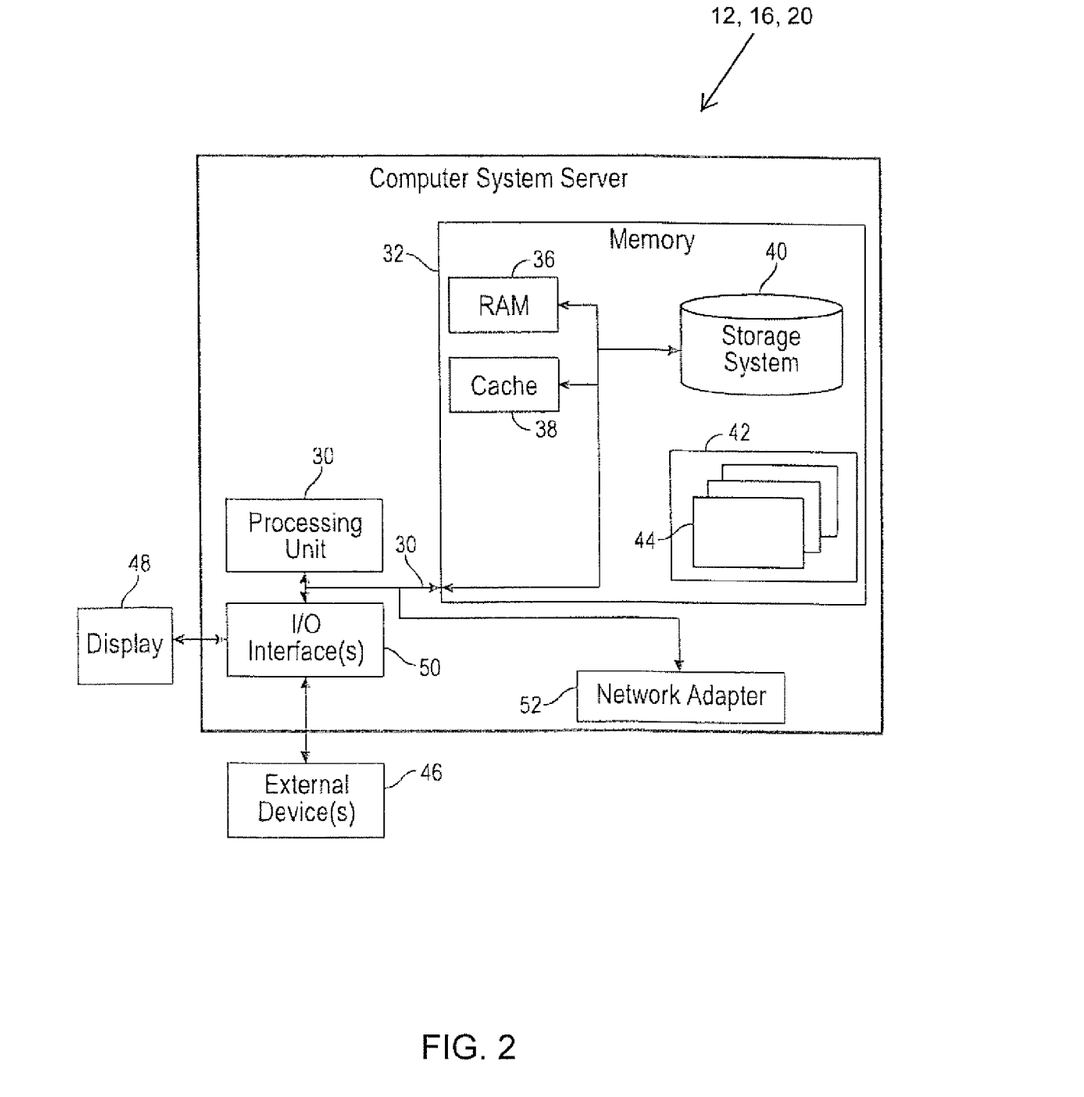
FIG. 2 is a simplified block diagram showing an illustrative computing device/server depicted in FIG. 1 in accordance with one aspect of the present application.

Referring now to FIG. 2, the computing devices 12 and/or servers 16, 20 may be described in more detail in terms of the machine elements that provide functionality to the systems and methods disclosed herein. The components of the computing devices 12 and/or servers 16, 20 may include, but are not limited to, one or more processors or processing units 30, a system memory 32, and a system bus 34 that couples various system components including the system memory 32 to the processor 30. The computing devices 12 and/or servers 16, 20 may typically include a variety of computer system readable media. Such media may be chosen from any available media, including non-transitory, volatile and non-volatile media, removable and non-removable media. The system memory 32 could include one or more personal computing system readable media in the form of volatile memory, such as a random access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein.

The computing device 12 and/or servers 16, 20 may communicate with one or more external devices 46 such as a keyboard, a pointing device, a display 48, or any similar devices (e.g., network card, modem, etc.). The display 48 may be a Light Emitting Diode (LED) display, Liquid Crystal Display (LCD) display, Cathode Ray Tube (CRT) display and similar display devices. The external devices 46 may enable the computing devices 12 and/or servers 16, 20 to communicate with other devices. Such communication may occur via Input/Output (I/O) interfaces 50. Alternatively, the computing devices and/or servers 18, 20 may communicate with one or more networks 18 such as a local area network (LAN), a general wide area network (WAN), and/or a public network via a network adapter 52. As depicted, the network adapter 52 may communicate with the other components of the computing device 18 via the bus 34.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

1. Inferring Access Times from Create and Modify Times

In order to migrate archive-desired (i.e. "aged") files from more expensive to less expensive storage, an electronic file migration system needs to know the time the file was last accessed. Unfortunately, it is an option on many file servers, or even recommended (e.g. on Windows Storage Server), to turn off retention of access time since it makes every read a write as data may need to be written to an output medium. Therefore, shares may have access times turned off when analysis and migration starts and administrators may be unwilling to turn access times back on.

The system 10 can make determination of necessary bandwidth for file migration based on its recognition of "ages" of each file since its last accessed time by a client. However, without the access times or file age information, the system 10 may have difficulties in determining which files to migrate and what the required bandwidth is for the potential file migration.

The system 10 may provide an electronic file migration system and a related method of operation that extrapolate access times from file-related create and modify times when an access time is unavailable. The extrapolated access times can be utilized to determine appropriate files for migration and required bandwidths involved in file migration.

The present systems 10 creates a model based on files stored having two or all three of the times (access, create and/or modify) available to determine what access times may look like relative to create and modify times. In accordance with one embodiment, the system 10 utilizes the create and modify times to infer an access time based on a large analytic model of how the access history over time, F(x), changes with time in the future, F(x,t).

There may be different functions that influence create, modify and access times. In accordance with one embodiment, F(x,t) may be a sum of Aging, Growth, Reaccess, and Deletion functions that leave traces in the create and modify times of files. The file migration system can infer an access time from the create and modify times to determine necessary bandwidth for file migrations, to migrate the aged files that are determined to be worthy of archiving to a cloud data storage, and to present the access time-related information to a user.

In accordance with one embodiment of the invention, F(x,t) is the file quantity (count or size) versus last access time at time t.

F(x,t2), T=t2−t1 is found by summing following simplified model functions

Aging function $$A(x,t2)=F(x-T,t1)$$

for $x>T$
 0 for $x<T$
Growth function $$G(x,t2)=g*F(x,t1)$$

for $x<T$
Reaccess function $$R(x,t2)=r*F(x,t1)$$

for $x<T$
Proportionally Applied $$-\Sigma[x<T]r*F(x,t1)$$

for $x>T,$
Delete function $$D(x,t2)=-d*F(x,t1)$$

for all $x$ $$F(x,t2)=0+g*F(x,t1)+r*F(x,t1)-d*F(x,t1)$$

for $x<T$ $$F(x-T,t1)-\Sigma[x<T]r*F(x,t1)-d*F(x,t1)$$

for $x>T$
Estimate of last access time as of time t, a(t), when access time not directly measurable
When create time c(t), a constant c, and modify time m(t) are available $$a(t)=c+k(m(t)-c), k\sim1.6-2.8$$

When create time is not available $$a(t)=m(t)+k, k>\sim32 \text{ days}$$

2. Probationary Period to Monitor and Selectively Erase an On-Premise File or a Corresponding Migrated File, Based on a Recent User Access of the On-Premise File Under the Probationary Period If a file management system administrator decides to turn on the access time recording feature, the system 10 may begin to receive access time information directly without needing to perform an inferred calculation as shown above. However, the access times earlier in the history of the file system are still unknown. Further, even though it is recommended that the file management system administrator turn on the access time recording feature, some may decide not to do so.

Because of this, another aspect of an embodiment of the present invention is providing a system 10 and a related method of operation that creates a probationary location in an on-premise data storage and a probationary period to monitor and selectively reinstate or erase the on-premise file based on a recent user file access of the on-premise file during the probationary period.

In accordance with one embodiment, the system 10 and associated method resolves the unavailability of all access time information by initiating the file migration with inferred access times determined from the create and modify times as disclosed above, and also by not removing the migrated files from an on-premise data storage until a predetermined probationary period has elapsed. The probationary period may be any time frame set-up within the system 10. In accordance with one embodiment, a 30 day (i.e., one month) time frame may be used. However, the above is given as an example and should not be seen in a limiting manner.

Based on the inferred access times, the files may be migrated in a probationary manner. The files are migrated in a low cost manner to a staging area. Access to the files would then go to the staging area. In accordance with one embodiment, the staging area would be on-premise so that one may limit the bandwidth and storage cost of sending the files to cloud data storage. The on-premise staging area may be on the same storage medium but moved to another directory. A link may be formed so that the system 10 can track and monitor the migrated files in the staging area.

If a particular migrated file is found (i.e. during a subsequent crawl from the system 10) to have been accessed during that probationary period, then the system 10 recognizes the recent user access and deletes the particular migrated file from the staging area, while reinstating the same particular file in the on-premise data storage in the original directory. If a particular migrated file is found during a subsequent crawl from the system 10 to not have been accessed during that probationary period, then the system 10 may transfer the file from the staging area to cloud data storage (i.e., server 20).

3. Probationary Period to Monitor and Selectively Erase an On-Premise File or a Corresponding Cloud Migrated File, Based on a Recent User Access of the On-Premise File Under the Probationary Period If a file management system administrator decides to turn on the access time recording feature, the system 10 may begin to receive access time information directly without needing to perform an inferred calculation as shown above. However, the access times earlier in the history of the file system are still unknown. Further, even though it is recommended that the file management system administrator to turn on the access time recording feature, some may decide not to do so.

Because of this, another aspect of an embodiment of the present invention is providing a system 10 and a related method of operation that migrate on-premise files to a cloud data storage with a probationary period to monitor and selectively erase the migrated on-premise files in the cloud data storage, if the on-premise files have been accessed during the probationary period.

This embodiment of the invention resolves the unavailability of all access times information by initiating the file migration with inferred access times determined from the create and modify times as disclosed above and also by not removing the migrated files from an on-premise data storage until a predetermined probationary period has elapsed. The probationary period may be any time frame set-up within the system 10. In accordance with one embodiment, a 30 day (i.e., one month) time frame may be used. However, the above is given as an example and should not be seen in a limiting manner.

Based on the inferred access times, the files may be migrated in a probationary manner. The files are migrated in a low cost manner to a staging area. Access to the files would then go to the staging area. In accordance with one embodiment, the staging area would be on-premise. The files may also be sent to cloud data storage if done in a low cost manner. As in the previous embodiment, the on-premise staging area may be on the same storage medium but moved to another directory. A link may be formed so that the system 10 can track and monitor the migrated files in the staging area.

If a particular migrated file is found during a subsequent crawl from the system 10 to be accessed during that probationary period, then the system 10 recognizes the recent user access and deletes the particular migrated file from the cloud data storage, while retaining or reinstating the same particular file back in the on-premise data storage.

If a particular migrated file is found during a subsequent crawl from the system 10 to not have been accessed during that probationary period, then the system 10 deletes the particular on-premise staging area file, while retaining the migrated file in the cloud data storage.

4. Minimize a Client's Data Access Latency During File Migration

It is desirable to ensure that an electronic file migration system does not cause significant or excessive performance impact, such as a prolonged latency to client access, during its operation with various on-premise data storages, cloud data storages, and computer servers in a data network.

Because of this, another aspect of an embodiment of the present invention is providing a system 10 and a related method of operation that migrates files with minimal performance impact on client access. The system 10 and method of operation uses symbolic links, wherein the target of the symbolic links is written in a particular format that allows redirection regardless of operating systems to ensures seamless access to the target files. The system 10 may use stubs instead of symbolic links on systems that do not support symbolic links for instance.

In accordance with one embodiment, the system 10 uses the following steps to migrate qualifying files while minimizing the file lock held times. The method depends on whether the system 10 is using symbolic links or stubs. A symbolic link (i.e., soft link) is a file that links to another file or directory using its path. Unlike a hard link, a symbolic link can link to any file or directory on any computer. A stub is a regular file that contains at least the necessary information to locate the target file. This allows clients and servers to redirect the access from the stub to the target file. For symbolic links, the system 10 uses the following steps:

Step 1: Create temporary link in the system directory structure to a copy of the target file on the target file system.

Step 2: Lock the source file.

Step 3: Copy/transfer source file in "chunks" of data.

Step 4: Verify if the access time of the file has been modified. If the access time has been modified, restore the source file to the original settings.

Step 5: Check to see if source file has been modified during the transfer (i.e., copying and moving of data in chunks).

Step 6: Abort migration of source file if the source file has been modified during the transfer as the source file no longer qualifies for transfer.

Step 7: Fix, repair, or cleanup attributes of the target copy, if needed.

Step 8: Unlock the file.

Step 9: Repeat the steps above until all the chunks have been copied.

Step 10: Move source file to a back-up directory.

Step 11: Verify the file in back-up directory matches the target file in order to decide whether to replace the file with the temporary link or restore the source file. When comparing the back-up to the target file, the system 10 may look at the last modify time, attributes of the file, user data, etc.

Step 12: Replace source file with the temporary link.

For stubs, the source file is locked and truncated so that stub data may be written to the file. Thus, the new path may be added to the truncated file. The system 10 may allow touch up of the attributes of the stub in terms of access time, modify time and access control.

In a preferred embodiment of the invention, the file migration is performed by a dedicated Virtual Appliance (VA) that has management applications that manage the source file system (i.e. called the "source share") and perform the data migration to an on-premise or a cloud target file system (i.e. called the "target share," or "cloud share").

The source share is mounted on the VA with sufficient privileges to perform the file migration to the target share. In addition to back-up privileges, it may be necessary to configure certain storage servers to allow the VA client to create symbolic links on the source share.

In a preferred embodiment of the invention, the symbolic links provide the same level of access as the original source file, which may necessitate inquiring the source file's attributes (e.g. ACLs for Windows servers) and applying them to the symbolic links. Furthermore, in case of a failure to migrate the file, the target file and the temporary symbolic link are cleaned up, repaired, reinstated, or deleted. Moreover, the crawler associated with the electronic file migration system is configured to detect and fix any discrepancies resulting from certain client-initiated modifying operations (e.g. "rename," "move," "delete," etc.) against the symbolic links or stubs.

5. Refrains from Migrating Files that have been Previously Migrated Before Fixing (i.e. "Cleaning Up" or Resolving) any Discrepancies Resulting from Renaming, Moving, or Deleting of a Migrated File The file migration substitutes files with symbolic links or stubs and certain client modifying operations impact the symbolic link without impacting its target. This can result in an undesired behavior. For example, in the case of a "rename" function, the symbolic link is renamed, but the target file remains unchanged. This does not impact client access. For example:

src::f1->tgt::f1//src::f1 is a symbolic link to target file tgt::f1 src::f2->tgt::f1//src::f1 is renamed however tgt::f1 is unchanged

However, the discrepancy between the source symbolic link name and the target file name should be resolved. Otherwise, if a new file is created with the old name and it's migration is subsequently attempted, it's migration would not proceed.

src::f2->tgt::f1//src::f2 is a symbolic link to target file tgt::f1 src::f1//src::f1 is a newly created file on the source file system

In the case of a "move" function to another parent directory, the symbolic link is moved but the target file may not have moved correspondingly. Client access is not impacted if the source directory hierarchy is not enforced on the target file system. However, if it is desired to enforce the source directory structure on the target file system to present the user with a similar hierarchy and enforce access control on the target, then the target file must be moved as well.

In the case of a "delete" function, the symbolic link is deleted but the target file may not have been deleted correspondingly. For optimal efficiency of the file migration, the target file should also be deleted from the target file system to avoid consuming space unnecessarily.

Because of this, another aspect of an embodiment of the present invention is providing a system 10 and a related method of operation that refrain from migrating previously-qualified files that have been previously migrated before fixing (i.e. "cleaning up" or resolving) any discrepancies resulting from renaming, moving, or deleting of a migrated file.

In a preferred embodiment of the invention, the electronic file migration system utilizes appropriate copy options or flags (e.g. "do not override existing files" as a flag, for example) to avoid overwriting existing files inadvertently.

The source file system needs to be examined periodically to detect and fix such discrepancies. This activity is referred herein as "cleanup" sessions, which perform the following procedures:

The target file is renamed and the symbolic link's target path is updated with the new name, if a "rename" function was initiated by the client.

If the source directory structure is enforced on the target file system, the target file is moved, and the symbolic link's target path is correspondingly updated with the new path.

Any orphaned target files (i.e. those that are no longer targeted by a symbolic link on the source file system) are deleted on the target file system.

Furthermore, it is preferable to refrain from migrating files that have qualified (or even qualifying files that have changed) after a cleanup, because it avoids attempting a file migration that may be prone to failure due to an existing mismatched target file. For example, if the qualifying criteria is the age of the file, then the minimal selectable qualifying age should exceed the selected file migration cleanup period.

In some instances, it may be desirable to perform the cleanup procedures during the data analysis to minimize the number of times the file system's directory structure is traversed, which in turn reduces performance impact on the source file system server's resources (e.g. reduces performance impact on an on-premise computer server with a source file system).

In this embodiment of the invention, client operations are generally not impacted by the conversion of the migrated file to a symbolic link, with the following exceptions:

"Rename" Function

Client access is not impacted when a symbolic link is renamed as its target file remains unchanged. For example:

src::f1->tgt::f1//src::f1 is a symbolic link to target file tgt::f1 src::f2->tgt::f1//src::f1 is renamed however tgt::f1 is unchanged

Such discrepancy between the source symbolic link name and the target file name should be resolved. Otherwise, if a new file is created with the old name and it's migration is subsequently attempted, it's migration would not proceed.

src::f2->tgt::f1//src::f2 is a symbolic link to target file tgt::f1 src::f1//src::f1 is a newly created file on the source share

The crawler needs to detect these discrepancies and fix them. As file migration is attempted on qualifying files only, it is sufficient to prevent the migration of a file that has qualified after a crawler's cleanup. If the qualification criteria is the age of the file, it is unlikely that a file starts qualifying before a cleanup has completed. In addition, the file migration should utilize the appropriate copy flags to avoid overwriting existing files inadvertently.

"Move" Function (e.g. Change of Parent Directory)

The target file is not affected when a symbolic link is moved. Client access is not impacted if the directory hierarchy is not enforced on the target share. However, if the directory structure is maintained on the target share, then the target file should be moved as well. In this case, the crawler detects and fixes directory structure discrepancies between the source and target shares. Similar precautions, as described in the "rename" case above, may be necessary to cope with situations in which a new file reuses the old name of the symbolic link.

"Delete" Function

The target file is not affected when a symbolic link is deleted. The crawler can detect and clean up stale target files.

There are scenarios when the symbolic link is copied before the file gets relocated. In these scenarios one cannot relocate the target file since it may be pointed to by other symbolic links on the source share. In these situation, the system 10 may need to track how many symbolic links are pointed to a given target file. The system 10 only proceeds to overwrite the target file when the system 10 knows that no one else is referencing the target file.

In accordance with one embodiment, the system 10 may accomplish the above by looking for discrepancies in the migration links in the source files. The system 10 looks to see if the location of the symbolic link matches the target of the link. If the location of the symbolic link does not match the target, the system 10 tries to fix the symbolic link. Before copying the target file to the desired location, the system 10 may check to see that another target file is not being overwritten. If the target location for the target file is already occupied by another target file, the system 10 may track how may references the target file has. The system 10 may keep track of the target files and references during the cloning process. At the end of the cloning process, the system 10 may go back and visit those links that we did not move to check the number of references to the target location. If no links reference the target file then it may be overwritten. If the target file is referenced by other links, the system 10 may have to wait until others have finished using it before overwriting the target file.

6. Create and Maintain Interoperable Remote Symbolic Links

The novel electronic file migration system intends to preserve operability of different protocols (Server Message Block (SMB) and Network File System (NFS)) during file migration and to provide the same level of access to existing and new clients. Unfortunately, there are several limitations that need to be resolved to achieve the interoperability:

a) remote symbolic links that target files on a remote file system cannot be resolved by both SMB and NFS clients at the same time without the presence of a software layer that performs a compatibility-enabling translation between the NFS target path and the SMB target path;

b) some client applications resolve remote symbolic links, targeting regular files, as directories and fail to open them;

Because of this, another aspect of an embodiment of the present invention is providing a system 10 and a related method of operation that creates and maintains interoperable remote symbolic links. The system 10 accomplishes this by creating symbolic links with absolute paths that are compatible with the Universal Naming Convention:

'/UNC/server/filesystem' or '\\server\filesystem' where 'server' is the server's IP address or name and 'filesystem' is the target file system name (e.g. /UNC/kserver/vol1 or/UNC/62.214.123.10/vol1.)

Such absolute symbolic links that target remote server paths are also referred to as "widelinks." An intermediate directory widelink to the target file system is used and the file symbolic links are created relative to it. This is to allow certain applications on certain SMB clients that resolve file widelinks as directories or directory symbolic links to open them.

File symbolic links with relative paths containing leading '../' may be invalidated in the case of a parent directory change. It is therefore best to create a directory widelink for each subdirectory that has at least one migrated file. This also avoids file symbolic links with paths containing multiple leading '../' in the case of deep directory trees. However, if the file is moved to a new directory that does not contain a directory widelink, the file symlink will become invalid.

The file system cleanup, which has been previously described, is configured to detect and fix such discrepancy by ensuring a local directory widelink is present where a migrated file, that is a symbolic link targeting a directory widelink, is present. It is also possible to get notification when a symbolic link is moved and ensure the widelink exists in the destination.

If the IP address or server name used to generate the directory widelinks changes because it is allocated dynamically, then the VA program detects such IP address or server name change(s) and proceeds with fixing the previously-generated widelinks. One example of fixing the previously-generated widelinks is updating the widelinks' target paths with the new IP address or the new server name.

In a preferred embodiment of the invention, the target share must be made accessible to the clients to allow access to the migrated files through the symbolic links:

For SMB clients, the share '\\server\share' may be mapped as a network drive or made accessible by joining the same domain as the source and client.

For NFS clients, the share must be mounted on the absolute path '/UNC/server/share'

The servers hosting the source and target file systems, the VA, and the file-accessing clients are able to access, create, or resolve symbolic links as needed.

In this embodiment of the invention, the file migration preserves the interoperability across various clients. The symbolic links replacing the migrated files provide the same access to existing and new clients. This can be achieved for Windows, Linux and Mac clients using symbolic links with absolute paths that are compatible with the Universal Naming Convention:

'/UNC/server/filesystem' or '\\server\filesystem' where 'server' is the server's IP address or name and 'filesystem' is the target file system name (e.g. /UNC/kserver/vol1 or/UNC/62.214.123.10/vol1).

Unix-generated file widelinks present some limitations. For example, some Windows applications see them as directories or directory links and fail to open them. For this reason, an intermediate directory widelink to the target share is used and the file symbolic links are created relative to it.

Furthermore, file-related symbolic links with relative paths containing leading '../' may be invalidated in the case of a parent directory change. It would therefore be best to create a directory widelink for each subdirectory that has at least one migrated file. This also avoids file symbolic links with paths containing multiple leading '../' in the case of deep directory trees. However, if the file is moved to a new directory that does not contain a directory widelink, the file symlink will become invalid. Thus, the crawler associated with the electronic file migration system should be configured to detect and fix such discrepancies. It is also possible to get notification when a symbolic link is moved and ensure the widelink in exists in the destination. Preferably, the generated directory widelinks are configured to be invisible or hidden from most users, and their target's access is restricted to prevent potential misuses. For example, the target share top level directory needs to be protected against deletion.

In an empirical test, this embodiment of the invention has been implemented and validated on different systems. Windows and Linux storage servers may require additional modules and/or drivers to allow interoperability across clients.

Figure 3:
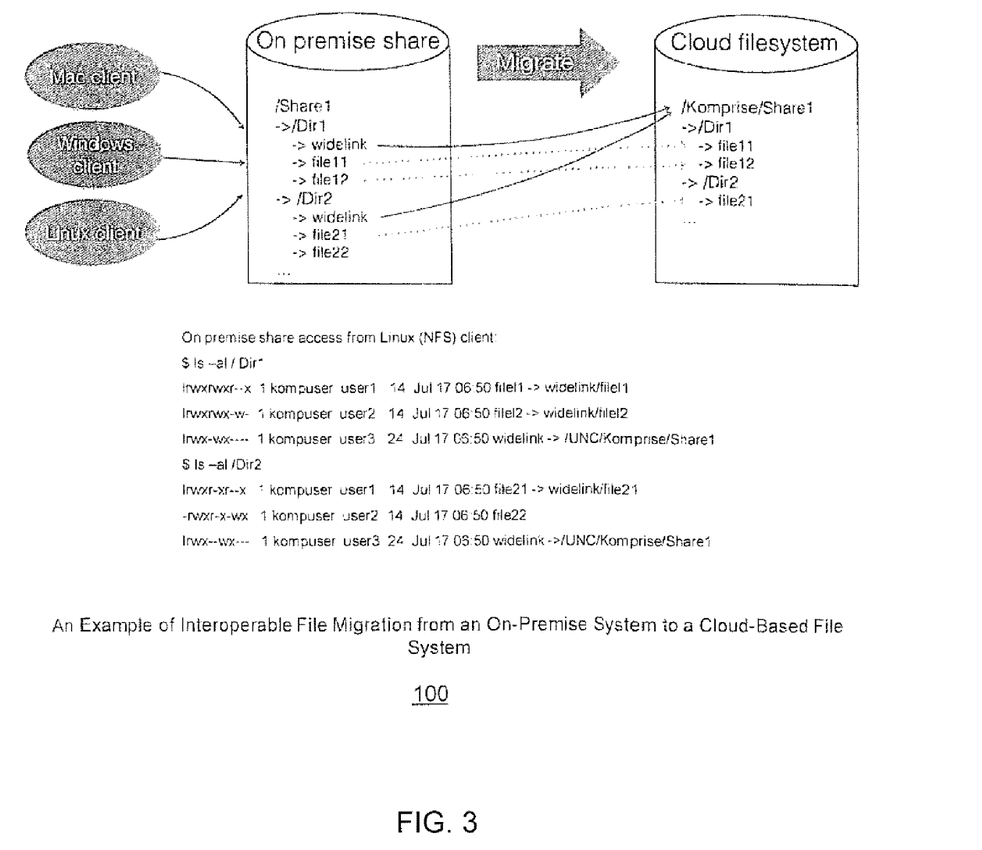
FIG. 3 shows an example of interoperable file migration from an on-premise system to a cloud-based file system executed in a cloud computing resource and a cloud data storage, in accordance with an embodiment of the invention.

FIG. 3 shows an example (100) of interoperable file migration from an on-premise system to a cloud-based file system executed in a cloud computing resource and a cloud data storage, in accordance with an embodiment of the invention.

Configuration

Storage Server Configuration

Most servers are enabled for symbolic links and widelinks support. However, certain servers may require special configuration. For example, one particular system requires enabling symbolic link support as well as updating its widelink translation table.

Because symbolic link configuration changes may have some security implications, restricting creation and following of symbolic links on certain computer servers may be important design considerations for a file migration system. On some Windows servers, such as Windows server 2012, only administrators have the permission to create symbolic links. However, it is possible to configure the server to grant such permission to other users.

Client Configuration

Windows clients accessing the source share are preferably empowered to support remote to remote symbolic links.

The target share is configured to be accessible to the clients, in order to allow access to the migrated files through the symbolic links:

For SMB clients, the share '\\server\share' must be mapped as a network drive.

For NFS clients, the share must be mounted on the absolute path '/UNC/server/share'.

Client Access to Target Share

Preferably, the VA is configured to allow a client to access the target share. For instance, the target share can be exported over NFS and SMB. It is also necessary to get VA IP address or server name from a user defined property. Unless the VA can be allocated a specific static IP address or server name, the electronic file migration system should receive that information as a user-defined property.

If the dynamically-allocated IP address or server name changes, then the VA should also detect such name changes and proceed with fixing the previously generated widelinks. In this case, the crawler is designed to detect all migration-generated widelinks and to update their target paths with the new IP address or server name.

7. Migration Engine that Accommodates Seamless File Migration from a Source Network Share to a Target Network Share A file server may not provide a convenient method to a read file without altering its access tune. For a novel file migration system that aspires to provide seamless file migration from a source network share to a target network share, not altering file access time during file migration is important, because a client does not want to confront undesirably-altered file access times due to an underlying automated file migration scheme (e.g. relocating inactive data from one data storage to another) provided by the novel file migration system.

Because of this, another aspect of an embodiment of the present invention is providing a system 10 and a related method of operation that supports an optimized and seamless file migration without altering its access time.

A novel file migration engine is configured to "lock" a file exclusively during the file migration process, as one or more chunks of the file are being copied from a source network share to a target network share. At the end of the file migration process, the migrated file is compared to see if the access time has changed. If the access time has changed, the access time is restored, if necessary, to its pre-migration record.

Furthermore, snapshots are preferably utilized to copy the file, which avoids altering access times. Moreover, a file replacement and/or substitution with a stub or a symbolic link is performed on a live source share.

8. A Client Filter Driver for Seamless Redirection of Access to Migrated Files from a Source Network Share to a Target Network Share A conventional file redirection is performed at a file server level. An example of such a conventional solution leaves a stub at a pre-migration source. When the user accesses the stub, which is a NetApp utility executed on the file server, it invokes a process to handle redirection of access to migrated files. This conventional solution makes IT administration more cumbersome, because the file server-based agent is vendor-specific, and requires installation and maintenance on each relevant file server for the IT administration.

Because of this, another aspect of an embodiment of the present invention is providing a system 10 and a related method of operation that provides a client filter driver for seamless redirection of access to migrated files from a source network share to a target network share. The client filter driver is able to redirect access to migrated files through sparse stubs or symbolic links located on the source share. The client filter driver is vendor agnostic and does not require filtering at a file server level.

A novel client filter driver is configured to redirect certain access from a source network share to a target network share without requiring an agent program to be executed on a file server, which hosts the source or target network share. Furthermore, the novel client filter driver is configured to redirect access to the migrated files through sparse stubs located on the source share while minimally impacting access to non-migrated files.

Furthermore, the novel client filter driver is configured to allow seamless access to the migrated files through symbolic links located on the source network share. The novel client filter driver is preferably configured to mask each symbolic link's property and attributes (e.g. ReparsePoint, file attribute, and size) of the symbolic links that target the migrated files when listing directories. The symbolic links appear to the end user (e.g. a client-side user) undistinguished from the migrated files, which the symbolic links had targeted. This procedure is completed with only minimal impact to the primary data path.

Moreover, the novel client filter driver is preferably vendor agnostic, with only minimal dependency on a network protocol.

In accordance with one embodiment, the novel client filter driver and method monitors certain attributes of the file such as sparse file attribute, offline attribute, and reparse point attribute. These attributes may be used for identifying the system stubs and symbolic links so as to not interfere with other files. When certain request are made that affect files on a given network share, the novel client filter driver and method looks at these attributes. Since these attributes are set specifically for the system's stubs and symbolic links, the system and method confirms that these are the system's stubs and symbolic links and does the redirection. The redirection may be to the target network share. In some situations, the redirection may be to the target and source network shares.

9. File Granular Variable Size Chunking and Metadata-Sensitive Transformations for a Cloud Resource-Based Data Storage Conventional large-scale data storage devices apply transformations such as compression and de-duplication as a broad policy, which indiscriminately covers an entire file share or volume. Such indiscriminate and broad applications of transformations hamper system performance and result in a non-optimal utilization of computing resources for large-scale file migration activities. For example, conventional transformations in its attempt to improve storage efficiency may be compressing files that have already been compressed, thus consuming unnecessary computing resources, adding to the computational overheads, and reducing the system performance. Further, attempts to re-compress already-compressed files typically result in no additional gains in storage efficiency. In many cases, a second application of compression even increases the file size.

Because of this, another aspect of an embodiment of the present invention is providing a system 10 and a related method of operation that provides file granular variable size chunking and metadata-sensitive transformations for a cloud resource-based data storage.

A novel method for granular variable size chunking and metadata-sensitive transformations is disclosed herein to resolve the above-mentioned conventional performance inefficiencies.

The term "chunk" in this context can be defined as a fixed-size block of a file data identifiable by the tuple (index, size), wherein one or more desired data transformations have been applied. The index implicitly identifies the offset within the file where a chunk starts. Let "F.B" (i.e. file block) denote an ordered set of file blocks that compose the file and are represented by the tuple. Furthermore, additional terms are defined as shown below:

Md=file metadata

Sz=file block size (which could vary for each individual file)

T=an ordered set of transformations applied to each block in F.B $T^{-1}$=an ordered set of the inverse of each of the transformations in T F.C=an ordered set of chunks derived after repeated application of transformations in T By creating a tuple using the above methods and contrivances, the transformations can be selectively applied to files. Furthermore, the tuple also enables selective determinations of transformations to files. For example, with a preemptive recognition that the file is already compressed, the file's set of transformations can skip a particular transformation associated with the file compression. This information can also be recorded in the tuple, which is distinct and unique for each file (e.g. F.B=(Md, Sz, T, $T^{-1}$, F.C)). Once the files are chunked, all the transformations, recording of transformations, and self-identified inverse transformations are on the chunks or blocks of data rather than on the entire files. Thus, in the description below, while the term file may be used, it should be understood that when describing the transformations, recording of transformations, and self-identified inverse transformations these operations are being applied to chunks/blocks of data of the file.

In one embodiment of the invention, kcfs is utilized to implement file granular variable block size chunking. A chunk in this context can be defined as a fixed size block of file data identifiable by the tuple (index, size) and to which certain predefined set of transformations have been applied. The index implicitly in-turn identifies the offset within the file that a chunk starts at. Furthermore, the size is required because files are not guaranteed to be multiples of the fixed block size.

Let the ordered set of transformations T={t1, t2, t3, . . . tn}, and let a correspondingly ordered set of the inverse of these be $T^{-1}$={$tn^{-1}$, . . . $t3^{-1}$, $t2^{-1}$, $t1^{-1}$}.

Figure 4:
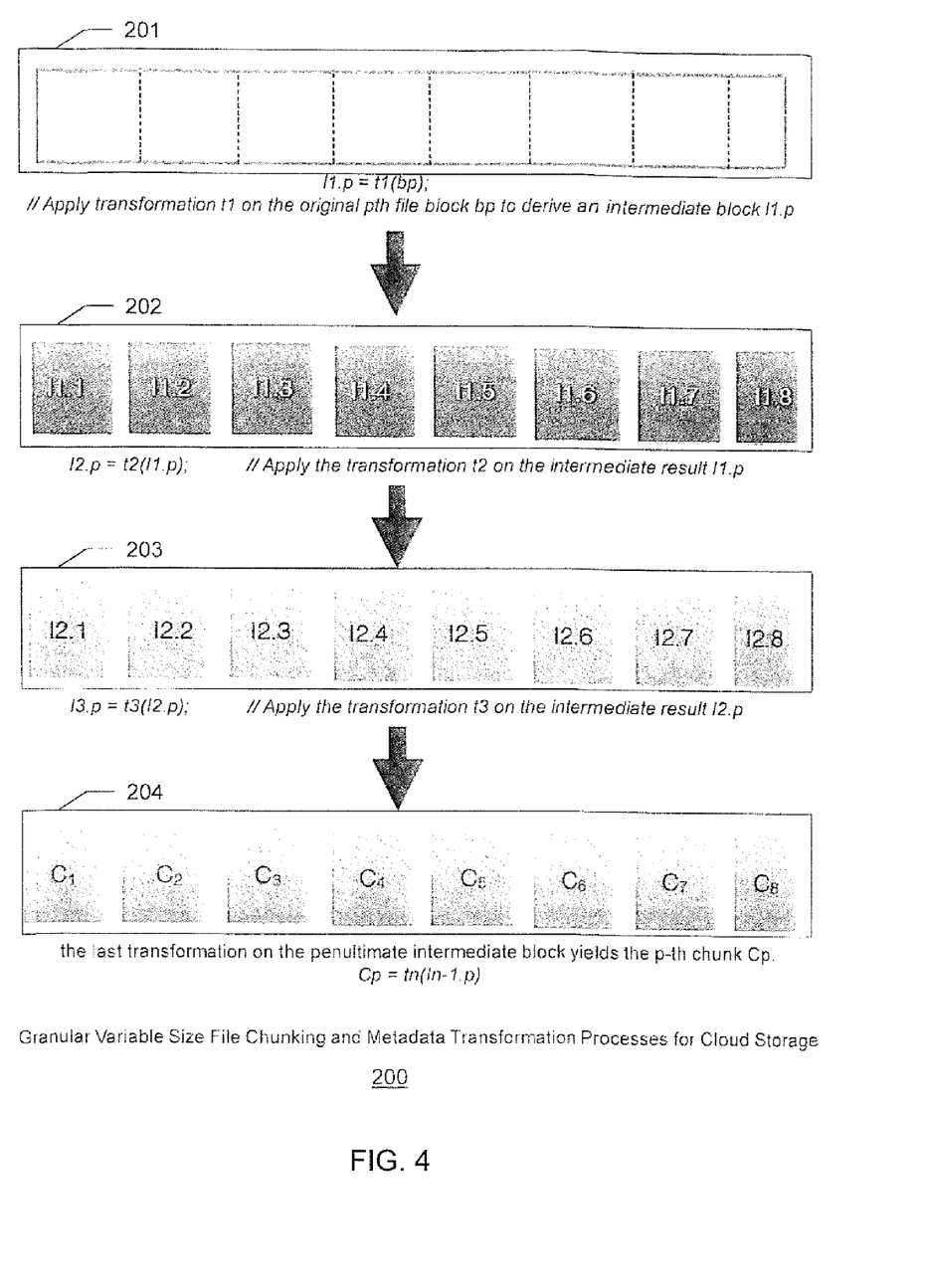
FIG. 4 shows an example of transformation steps for granular variable size file chunking and metadata transformation processes for cloud storage, in accordance with an embodiment of the invention.

FIG. 4 shows an example (200) of transformation steps for granular variable size file chunking and metadata transformation processes for cloud storage, in accordance with an embodiment of the invention.

A file can be conceptualized as an ordered set of data blocks (201), F.B={b1, b2, b3, . . . bm}, where all bx, except bm, are of a fixed and equal size. bm may be less than or equal to that fixed size.

Given these, the creation of a chunk (Cp) or the chunking operation can be defined as follows:

$I1.p=t1(bp)$; //Apply transformation $t1$ on the original $p^{th}$ file block $bp$ to derive an intermediate block $I1.p$ A first transformation, t1, is applied to the initial set of data block (201) and the intermediate result, I1.p, is shown as a second set of data blocks (202).

Then, a second transformation, t2, is applied to the second set of data blocks (202), and the next intermediate result, I2.p, is shown as a third set of data blocks (203).

$I2.p=t2(I1.p)$; //Apply the transformation $t2$ on the intermediate result $I1.p$ Similarly, a third transformation, t3, is applied to the third set of data blocks (203), and the next intermediate result, I3.p, is shown as a fourth set of data blocks (204)

$I3p=t3(I2.p)$; //Apply the transformation $t3$ on the intermediate result $I2.p$ This process can be reiterated until the last transformation on the penultimate intermediate block yields the $p$th chunk Cp:

$Cp=tn(In-1.p)$

Furthermore, the original file block can be recovered by applying the corresponding inverse transformations, or in the opposite order as listed in T−1.

Therefore, a file (i.e. F.B) can be conceptualized as the being represented completely by the ordered set F.C={C1, C2, C3 . . . Cn}.

However, in order to recover this file in its original form and content, all of the following information, as listed in this tuple, is required, as defined by the following expression:

$F.B=(Sz,T,T^{-1},F.C)$ where Sz if the fixed size of the file block.

The example illustrated in FIG. 4 is merely one of many potential implementations for file granular chunking, which offers numerous advantages when large files are being stored into and retrieved from the cloud computing resources.

The set of transformations can be unique for each file. For example, if one of the transformations is related to data compression, then applying this to an already-compressed file is unnecessary and even inefficient in some cases. Therefore, with the preemptive knowledge of the status of the file compression, the set of transformations can be dynamically constructed to exclude compressions and/or decompressions from a list of transformations to perform for the already-compressed file.

In one embodiment of the invention, an example of specific implementations for file granular chunking may be defined as follows:

($t1,t1^{-1}$)→(compression, decompression).

($t2,t2^{-1}$)→(encryption, decryption)

($t3,t3^{-1}$)→(deduplication, lookup).

10. File Metadata Management System is Configured to Physically Isolate Metadata Objects for Portability If file attributes and other file-related metadata are unremovably attached to underlying contents of each file, then numerous file migration management features, such as file search optimizations, listing, and restoring back to the source, may not be performed in a rapid and efficient manner.

Because of this, another aspect of an embodiment of the present invention is providing a system 10 and a related method of operation to provide file metadata management to optimize searches, listing, and restoring back to a source, wherein the file metadata may include file attributes such as file names, owners, access times, and other parameters associated with each file. The system 10 and related method of operation may be configured to physically isolate metadata objects for portability. Furthermore, the metadata management system may be configured to store and manage unlimited and extensible extended attributes.

Figure 5:
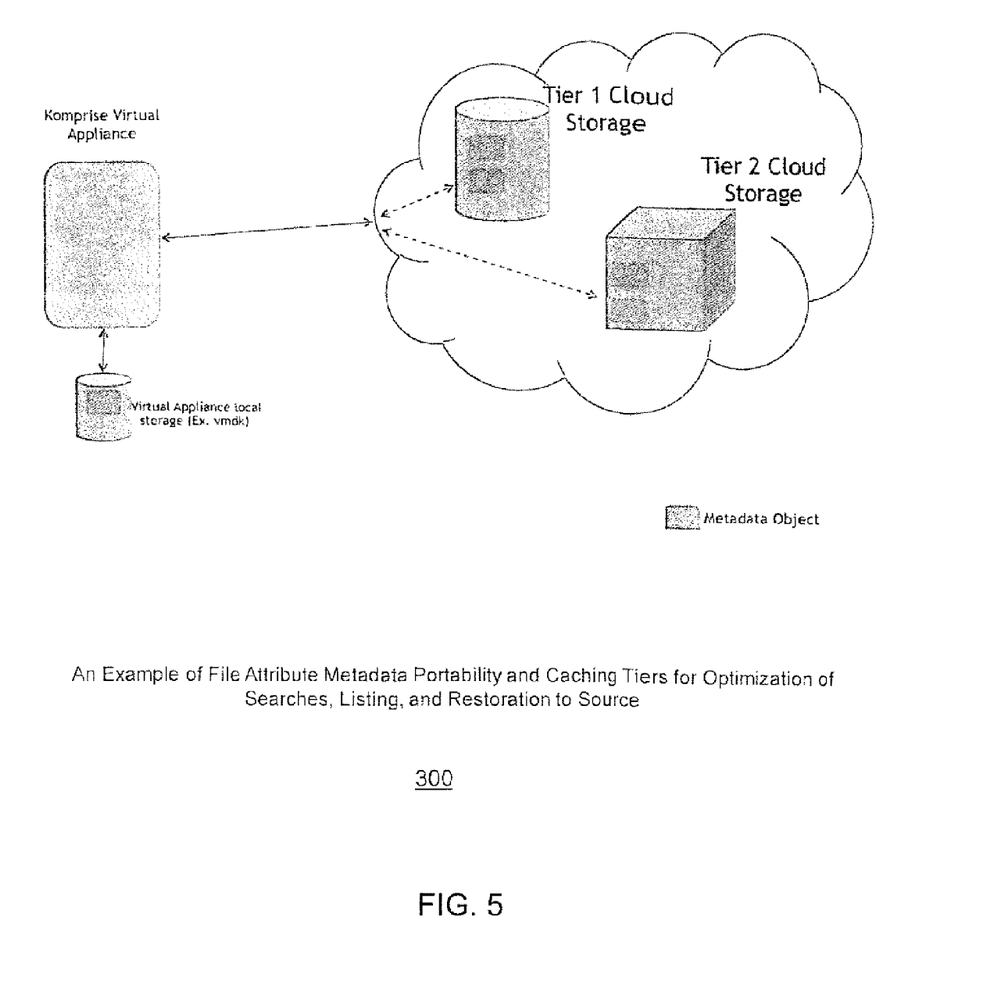
FIG. 5 shows an example of file attribute metadata portability and caching tier for optimization of searches, listing, and restoration to source, in accordance with an embodiment of the invention.

FIG. 5 shows an example of file attribute metadata portability and caching tiers for optimization of searches, listing, and restoration to source, in accordance with an embodiment of the invention.

By providing a novel system and a related method that can isolate and store file attributes and other file-related metadata as highly-portable objects, the novel electronic file metadata management system is able to offer flexible and portable selective caching, quick accesses by placing them in a rapidly-accessible media storage unit (e.g. a flash drive or another solid state device), and mirroring a cloud target with an on-premise footprint on demand.

Furthermore, the novel electronic file metadata management system is able to store and manage unlimited and extensible extended attributes, which provide a unified container for persistently storing application-defined extended attributes as well as value-added file system private attributes that can grow indefinitely. In addition, the novel electronic file metadata management system is also configured to provide content-aware metadata to enable convenient indexing and searching.

In accordance with one embodiment, within a file, the file attributes and other file-related metadata (hereinafter metadata or metadata objects) may be separated from the rest of the file. The metadata may then be stored apart from the remainder of the file. The metadata may be stored on different media storage devices from the remainder of the file. In accordance with one embodiment, separate metadata objects can be located in different media storage locations within the system 10. In other words, all metadata objects do not have to be stored in the same location within the system 10 (FIG. 1) and each metadata object may be located in different media storage locations within the system 10 and independently of each other. As shown in FIG. 5, some metadata objects may be stored in Tier 1 Cloud storage while others metadata objects may be stored in Tier 2 Cloud storage, while other metadata objects may be stored in other locations within the system 10. A naming convention on the files may be used to link/combine the different metadata objects with the corresponding files. The system 10 may use the naming convention to pull and combine the metadata object with the rest of the file when a request is made for a specific file.

As stated above, the novel electronic file metadata management system is also configured to provide content-aware metadata to enable convenient indexing and searching. The system 10 may allow a user to perform a query to find some set of metadata objects. Based on the results found, the user may then take the found metadata objects and refine the information in order to go get the actual data and metadata content.

11. Scalable Multi-Server Data Migration Environment that Allows Rapid and Efficient File Migration Conventional data traffic load balancing methods do not adequately address challenges associated with analyzing a huge load of data (e.g. Petabytes of data) across a plurality of scalable computer servers, which require rapid and efficient load balancing decision making regardless of the amount and the complexity of traffic loads. Furthermore, conventional load balancing analysis and methods do not address load balancing in context of source or target network shares Because of this, another aspect of an embodiment of the present invention is providing a system 10 and a related method of operation for providing file migration-related data traffic load balancing analysis across a multiple number of servers. This system also provides fault tolerance for load balancing analysis, file migration, and access across the plurality of servers.

A novel data traffic load balancing analysis program is executed on a server to analyze migrating data from multiple source shares to multiple target shares. In one embodiment, the server is typically an on-premise virtual appliance, which is configured by an administrator to access a number of shares of a number of file servers. The server performs analysis of the shares to collect data of interest to the administrator in guiding the administrator's choices on migration, copy, and backup. In response to administrator policies, the server performs migration, copy, or backup from the sources to desired targets. The server also provides an access interface to the files resident on the target.

Furthermore, a plurality of servers can be configured to perform load balancing analysis, data migration, and access to scale up compute, I/O, and network to satisfy a higher numbers of shares. Moreover, load balancing analysis and migration activities across the several servers can be performed by dividing the load of high numbers of shares based on metrics of load per share, such as number of shares, number of files, total size of files, or schedule of analysis and migration of the shares. This division can be based on a distributed algorithm over state shared in common among the servers, or it can be declared by a single director over the many servers.

In one embodiment of the invention, load balancing the target access functionality across the several servers can be achieved by dividing the load of high numbers of shares migrated to targets based on access patterns that need to be satisfied. In order to present exactly one access IP address to potential clients, the plurality of scalable servers can either sit behind a separate load balancer, or it can allocate the access IP address to a particular server best suited to satisfy the load. That particular server can handle all access, or it can perform redirection behind the server hosting the IP address to the plurality of scalable servers in order to parallelize slower access to the targets while not overloading the fast network between the servers.

Furthermore, the present invention can also provide a scalable level of fault tolerance in load balancing analysis, migration, and access across a multiple number of scalable servers. For example, failure of services or servers in this multi-server system can be detected by other servers in the multi-server system. The fault detection can trigger a failover mechanism wherein the source and target services lost with the failure can be reallocated to other servers in the system using the same load balancing methods described herein for analysis, migration, and access.

The foregoing description is illustrative of particular embodiments of the invention, but is not meant to be a limitation upon the practice thereof. The following claims, including all equivalents thereof, are intended to define the scope of the invention.

What is claimed is:

1. An electronic file migration system comprising:
    a processor;
    a memory coupled to the processor, the memory storing program instructions that when executed by the processor, causes the processor to:
    receive a request to migrate a file from a current network location to a network target or cloud storage device;
    transfer the file to the network target or cloud storage device;
    create symbolic links and stubs, wherein a target file of the symbolic links is written in a predefined format that allows redirection regardless of operating systems or client network protocols to ensure access to the target files;

provide an access layer as a network protocol file server to retrieve targeted files from the network target or cloud storage device;

target the symbolic links and stubs to the access layer of the electronic file migration system through an IP address or server name;

provide file metadata management of the file attributes and other file-related metadata of a source file, storing the metadata in separate metadata objects; and combine the metadata objects with the rest of the file when a request is made for the file and provide the same level of access as an original source file.

2. The electronic file migration system of claim 1, wherein the memory storing program instructions that when executed by the processor, causes the processor to:

qualify the file based on access time or monitor the file for access by a user for a predetermined timeframe; and transfer the file to the target cloud storage device if the file was not accessed since the predetermined timeframe or is not accessed during the predetermined timeframe.

3. The electronic file migration system of claim 1, wherein the memory storing program instructions that when executed by the processor, causes the processor to:

transfer the file from a current source location to a new source location;

qualify the file based on access time or monitor the file for access by the user for a predetermined timeframe;

transfer the file from the new source location to a target storage device if the file has not been accessed since the predetermined timeframe or is not accessed during the predetermined timeframe; and reinstate the file to the current source location if the file is accessed during the predetermined timeframe.

4. The electronic file migration system of claim 1, wherein the memory storing program instructions that when executed by the processor, causes the processor to:

transfer the file from a current source location to a new source location;

transfer a copy of the file to a target device or cloud storage device;

monitor the file for access by the user for a predetermined timeframe;

delete the file from the new source location if the file is not accessed during the predetermined timeframe; and reinstating the file to the current source location if the file is accessed during the predetermined timeframe and deleting the copy of the file to the target device or cloud storage device.

5. The electronic file migration system of claim 1, wherein the memory storing program instructions that when executed by the processor, causes the processor to:

create a temporary link in a system directory structure to a copy of a target file on a target file system;

transfer a source file in blocks of data;

check if the source file has been modified during the transfer;

abort migration of source file if the source file has been modified during the transfer;

move the source file to a back-up directory;

compare the source file in the back-up directory to the target file for mismatch errors; and replace the source file with the temporary link if no mismatch errors detected or restore the source file if mismatch errors detected.

6. The electronic file migration system of claim 5, wherein the memory storing program instructions that when executed by the processor, causes the processor to one of fix, repair, or cleanup attributes of the target file.

7. The electronic file migration system of claim 5, wherein the memory storing program instructions that when executed by the processor, causes the processor to:

verify if the access time of the source file has been modified; and restore the source file to the original settings when the access time has been modified.

8. The electronic file migration system of claim 1, wherein the memory storing program instructions that when executed by the processor, causes the processor to refrain from migrating qualified source files that have been previously migrated before fixing discrepancies resulting from renaming, moving, or deleting of a migrated file.

9. The electronic file migration system of claim 1, wherein the memory storing program instructions that when executed by the processor, causes the processor to:

track how many symbolic links are pointed to a given target file; and overwrite the target file when the target file is no longer referenced by multiple symbolic links.

10. The electronic file migration system of claim 1, wherein the memory storing program instructions that when executed by the processor, causes the processor to create and maintain interoperable remote symbolic links.

11. The electronic file migration system of claim 1, wherein the memory storing program instructions that when executed by the processor, causes the processor to read the file and not alter the access time of the file.

12. The electronic file migration system of claim 1, wherein the memory storing program instructions that when executed by the processor, causes the processor to:

lock the file during a file migration process when blocks of data of the file are being copied from a source network to a target network;

checking to see if the access time of the file that was migrated has changed; and restoring the access time when the access time has changed.

13. The electronic file migration system of claim 1, wherein the memory storing program instructions that when executed by the processor, causes the processor to redirect access to migrated files through one of sparse stubs or symbolic links located on a source share network without using a server agent program on a storage system.

14. The electronic file migration system of claim 13, wherein the memory storing program instructions that when executed by the processor, causes the processor to:

allow access to the migrated files though symbolic links located on the source share network; and mask properties and attributes of each symbolic link that target the migrated files when listing directories;

wherein the symbolic links appear undistinguished from the migrated files which the symbolic links had targeted to an end user.

15. The electronic file migration system of claim 13, wherein the memory storing program instructions that when executed by the processor, causes the processor to monitor predefined attributes to identify sparse stubs or symbolic links to operate upon.

16. The electronic file migration system of claim 1, wherein the memory storing program instructions that when executed by the processor, causes the processor to mask predefined properties and attributes of each sparse stub or symbolic link that target the file that was migrated.

17. The electronic file migration system of claim 1, wherein the memory storing program instructions that when executed by the processor, causes the processor to provides file granular variable size chunking and metadata-sensitive transformations for a cloud resource-based data storage.

18. The electronic file migration system of claim 17, wherein the memory storing program instructions that when executed by the processor, causes the processor to: transform and inverse transform blocks of data that have been chunked.

19. The electronic file migration system of claim 1, wherein the memory storing program instructions that when executed by the processor, causes the processor to:
 separate metadata of the file from user data of the file; and
 store the metadata of the file in a separate location from the user data.

20. The electronic file migration system of claim 19, wherein the memory storing program instructions that when executed by the processor, causes the processor to store and manage extended file attributes to provide a unified container for persistently storing application-defined extended attributes as well as value-adding file system private attributes.

21. The electronic file migration system of claim 19, wherein a naming convention is used to combine the metadata of the file with the user data of the file.

22. The electronic file migration system of claim 1, wherein the memory storing program instructions that when executed by the processor, causes the processor to: load balance the migrating data to a plurality of servers based on metrics of loads of migrating sources and targets; and
 provide fault tolerance through fault detection and rebalancing of source and target loads.

23. The electronic file migration system of claim 22, wherein the memory storing program instructions that when executed by the processor, causes the processor to allocate one access point on one server for load balancing of the migrating data to the plurality of servers, wherein the one server having the one access point can perform all access or perform redirection to other servers.

* * * * *